(12) United States Patent
Stafford

(10) Patent No.: US 10,586,566 B1
(45) Date of Patent: Mar. 10, 2020

(54) OPTICAL DEVICE FOR DATA STORAGE AND COMPUTE OPERATIONS

(71) Applicant: SONY INTERACTIVE ENTERTAINMENT INC., Tokyo (JP)

(72) Inventor: Jeffrey R. Stafford, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/297,319

(22) Filed: Mar. 8, 2019

(51) Int. Cl.
| | |
|---|---|
| *G11B 7/0065* | (2006.01) |
| *G11B 7/1353* | (2012.01) |
| *G02B 27/42* | (2006.01) |
| *G02B 5/20* | (2006.01) |
| *A63F 13/25* | (2014.01) |
| *A63F 13/95* | (2014.01) |

(52) U.S. Cl.
CPC ............ *G11B 7/1353* (2013.01); *G02B 5/208* (2013.01); *G02B 27/4205* (2013.01); *G11B 7/0065* (2013.01); *A63F 13/25* (2014.09); *A63F 13/95* (2014.09); *A63F 2300/206* (2013.01); *A63F 2300/30* (2013.01)

(58) Field of Classification Search
CPC ........ G11B 7/0065; G11B 2007/00653; G11B 2007/00656; G11B 2220/2504; H04N 5/89; G01F 3/013; G02B 6/0016; G02B 6/105; G02B 27/0172; G02B 1/225; G02B 1/3526; G02B 1/365; G06N 3/0675; G06N 3/08; G06N 3/005; G06N 3/008
See application file for complete search history.

(56) References Cited

U.S. PATENT DOCUMENTS 7,046,892 B2 * 5/2006 Yoshikawa .......... G03H 1/0408
385/129

OTHER PUBLICATIONS

"UCLA Researchers Create All-Optical Diffractive Deep Neural Network That is 3D Printed," retrieved on Feb. 7, 2019 at http://www.photonics.com/Article.aspx?AID=63751, 4 pages.

* cited by examiner

*Primary Examiner* — Nabil Z Hindi
(74) *Attorney, Agent, or Firm* — Kilpatrick Townsend & Stockton LLP (57) ABSTRACT

Generally, techniques related to an optical computer system and use thereof are described. In an example, an optical computer system includes a multi-purpose optical device, an imager, and an image sensor. The multi-purpose optical device is configured for different purposes, such as for data storage and for compute operations. The configuration utilizes diffractive optical layers that include different diffraction elements. The imager displays an image to the multi-purpose optical device. The image encodes command-related data depending on the purpose to be invoked, such a data location for a data read or input for a compute command. Light of the image travels to the multi-purpose device and is diffracted from the diffractive optical layers. The diffracted light is detected by the image sensor that converts it into an output.

20 Claims, 9 Drawing Sheets

OPTICAL DEVICE FOR DATA STORAGE AND COMPUTE OPERATIONS

CROSS-REFERENCES TO RELATED APPLICATIONS

NOT APPLICABLE

BACKGROUND

Demand for high data storage is increasing. For example, as video games become more complex, the size of the video game data and files increases. When this size is larger than the capacity of current disc-based media, such media may no longer be usable. Instead, a client-server architecture can be set up, where the video game data and files are stored on the server for download to the client. However, network download speeds may increase the loading time and, hence, delay the availability of a video game to a video game player.

Furthermore, the complexity of compute operations is increasing. Referring back to the video game example, the use of artificial intelligence (AI) to perform various video-game related operations is becoming popular. However, AI processing can levy a large computational burden on the client and/or the server. For instance, dedicated computing hardware or compute cycles can be allocated to such processing, rendering such resources unavailable to other video game processes.

Hence, there is a need to improve the resources for high data storage and complex compute operations.

BRIEF SUMMARY

Generally, techniques related to an optical computer system and use thereof are described. In an example, the optical computer system includes an optical device configured to store data and perform one or more compute operations, such as a multi-purpose optical device. The optical device includes a plurality of diffractive optical layers made out of one or more solid materials. A first diffractive optical layer of the plurality of diffractive optical layers includes an optical data storage portion and a first optical compute portion. The optical data storage portion stores at least a subset of the data. The first optical compute portion includes diffraction elements that correspond to a sub-operation of the one or more compute operations. A second diffractive optical layer of the plurality of diffractive optical layers includes a second optical compute portion. The first optical compute portion and the second optical compute portion are arranged based on light diffraction from the first optical compute portion to the second optical compute portion. The optical computer system also includes an imager configured to display an image to the optical device. Further, the optical computer system includes an image sensor configured to receive light diffracted from the optical device based on the image.

In an example, the optical device is arranged between the imager and the image sensor. The optical device is transmissive of the light. In another example, the imager and the image sensor are arranged on a same side relative to the optical device. In this example, the optical device is reflective of the light.

In an example, each of the plurality of diffractive optical layers includes an optical compute portion and corresponds to a layer or an artificial neural network. Each of the plurality of diffractive optical layers further includes an optical data storage portion.

In an example, the optical data storage portion is a holographic data storage portion. The holographic data storage portion and the first optical compute portion are arranged side-by-side.

In an example, the imager includes an array of light sources, beam manipulation optics, and an optical modulator mounted on an actuator. The image sensor includes an array of light sensors mounted on the actuator.

In an example, the image is displayed as a monochromatic image having a wavelength between 400 nm and 700 nm.

In an example, the optical computer system further includes an actuator. The imager is attached to the actuator. The actuator is configured to move the imager between a first position corresponding to the optical data storage portion and a second position corresponding to the first optical compute portion.

In an example, the imager includes an array of light sources. A first portion of the array has a first position corresponding to the optical data storage portion. A second portion of the array has a second position corresponding to the first optical compute portion.

In an example, the diffraction elements of the first optical compute portion includes pixels that are smaller in size than pixels of the imager and pixels of the image sensor.

In an example, the first diffractive optical layer and the second diffractive optical layer are attached together via an optical glue in a stack arrangement. The optical device further includes an ultraviolet light blocking film attached to the first diffractive optical layer. The one or more solid materials include a polymeric material transparent to light having a wavelength between 400 nm and 700 nm.

In an example, the first diffractive optical layer includes electronic ink that form the diffraction elements.

In an example, computer-readable instructions are stored on a non-transitory computer medium. Upon execution on a computer system, such as the optical computer system, these instructions cause the computer system to perform operations. The operations include displaying, to the optical device of the computer system, a first image based on a data read command. The operations also include reading the data from the optical data storage portion based on first light diffracted from the optical device in response to the first image. Further, the operations includes displaying, to the optical device, a second image based on a compute command for a compute operation. The operations also include detecting an output of performing the compute operation by the optical device. The output is detected based on second light diffracted from the optical device in response to the second image.

In an example, the first image encodes a location of the data on the optical data storage portion. The second image encodes an input to the compute operation. The first image and the second image are displayed sequentially or in parallel.

A further understanding of the nature and the advantages of the embodiments disclosed and suggested herein may be realized by reference to the remaining portions of the specification and the attached drawings.

DETAILED DESCRIPTION

Generally, techniques related to an optical computer system and use thereof are described. In an example, an optical computer system includes a multi-purpose optical device, an imager, and an image sensor. The imager displays an image to the multi-purpose optical device. The image is optically processed through diffractive optical layers of the multi-purpose optical device and the diffracted light from the multi-purpose optical device is detected by the image sensor. The multi-purpose optical device is configured to store data and perform one or more compute operations. For instance, at least one of the diffractive optical layers include an optical data storage portion that stores the data. Further, some or all of the diffractive optical layers include optical compute portions. In turn, each of the optical compute portions includes diffraction elements that diffract light to a next optical compute operations and the light diffraction collectively through the optical compute portions corresponds to an optical compute operation. Based on the information encoded in the image, data can be read from the optical data storage and/or the optical compute operation can be invoked. For instance, when the image encodes a data location on the optical data storage portion, light travels through the diffractive optical layers to that location and out from the multi-purpose device and is detected by the image sensor. The image sensor converts the detected light into a read of the data stored at that data location. In comparison, when the image encodes an input to the compute operation, light travels through the optical compute portions and out from the multi-purpose device and is detected by the image sensor. Here, the image sensor converts the detected light into an output of optically performing the operation on the input.

To illustrate, consider an example of an optical computer system implemented as an optical disk drive. In this illustrative example, the multi-purpose optical device represents an optical disk or card, and the imager and image sensor represent a reader head. More specifically, the multi-purpose optical device includes a plurality of diffractive optical layers made out of polymeric material, such as plastic, transparent to light having a wavelength between 400 nm and 700 nm. These layers are attached with transparent optical glue in a stack arrangement. Each of the diffractive optical layers includes an optical data storage portion and an optical compute portion arranged side-by-side. In turn, each optical data storage portion stores data holographically, meaning the data is stored as collection interference patterns. Each of the optical compute portions corresponds to a layer of an artificial neural network and its diffraction elements are arranged to optically perform the equivalent transformation of the corresponding neural network layer. The artificial neural network is pre-trained to perform a compute operation. The various optical compute portions are arranged such that light is diffracted through these portions in a manner equivalent to data transformations between the neural network layers. The imager includes an array of monochromatic light sources, such as an array of micro light emitting diodes (μLEDs), beam manipulation optics, and an optical modulator mounted on an actuating arm. The image sensor includes an array of CCD or CMOS sensors also mounted on the actuating arm. Upon a first image encoding the location of data to be read from a particular optical data portion, the actuating arm moves the imager and the image sensor to a position parallel to the optical data storage portions and the first image is emitted as a light from the imager. The light is diffracted through the optical data storage portions, including through the data location. The image sensor detects the diffracted light that is output from the multi-purpose optical device and converts the diffracted light to read data. Upon a second image encoding input for the compute operation, the actuating arm moves the imager and the image sensor to a position parallel to the optical compute portions and the second image is emitted as a light from the imager. The light is diffracted through the optical compute portions. The image sensor detects the diffracted light that is output from the multi-purpose optical device and converts the diffracted light to an output of the compute operation.

The optical computer system provides various technical advantages according to embodiments of the present disclosure. For example, high data storage can be achieved in a small footprint. In particular, one terabit of data can be stored in one square millimeter within each of the diffractive optical layers. In addition, data reads and compute operations can be performed at the speed of light. Hence, such an optical computer system can free up other computing resources to perform other operations.

In the interest of clarity of explanation, various embodiments of the present disclosure are described in connection with a video game system that includes an optical computer system. However, the embodiments are not limited as such and similarly apply to any computer system that integrates or interfaces with such an optical system, including a personal computer, a mobile device, or a datacenter. Also in the interest of clarity of explanation, various embodiments of the present disclosure are described in connection with a multi-purpose optical device that stores data holographically and that optically perform compute operations of a pre-trained artificial neural network. However, the embodiments are not limited as such and similarly apply to other types of optical storage including, for instance, pit-based storage, and/or to other types of artificial intelligence models.

Figure 1:
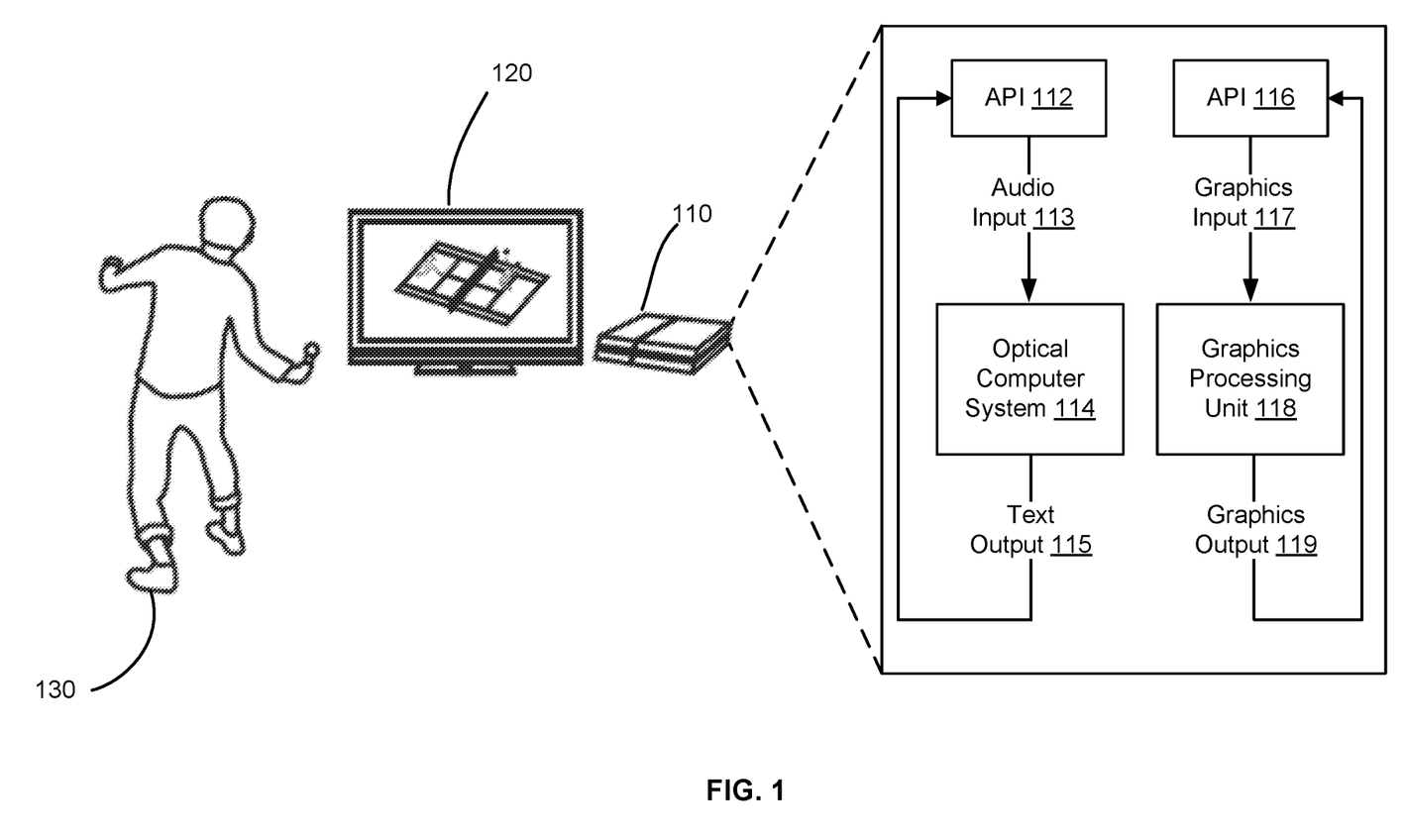
FIG. 1 illustrates an example video game console that includes an optical computer system, according to embodiments of the present disclosure.

FIG. 1 illustrates an example video game console 110 that includes an optical computer system 114, according to embodiments of the present disclosure. As illustrated, the video game console 110 interfaces with a display 120 to present interactive content of a video game to a video game player 130. The video game console 110 executes the video game. Some or all of the video game data can be stored on the optical computer system 114 (e.g., on optical data storage portions thereof). Additionally or alternatively, some or all of the operations of the video game can be executed on the optical computer system 114 (e.g., on optical compute portions thereof).

In an example, the video game console 110 includes the optical computer system 114 along with other computational resources. As illustrated in FIG. 1, these computational resources include a graphics processing unit (GPU) 118, although other components are possible such as a memory, a central processing unit (CPU), and the like as further illustrated in FIG. 9. The optical computer system 114 provides optical data storage, such as holographic data storage, and optical compute operations, such as operations of an AI model implemented as a collection of diffractive optical layers. Hence, data can be read from and compute operations can be performed by the optical computer system 114 at the speed of light. In addition, some of the data storage and some of the compute operations can be moved from the other computational resources to the optical computer system 114, thereby freeing up these resources for other tasks.

In an illustration, the optical computer system 114 is used for two purposes. First, to store video game data of the video game. In this way, depending on a context of the video game, the relevant video game data can be read from the optical computer system 114 and rendered by the GPU 118 on the display 120. Second, the optical computer system 114 is set-up to perform speech recognition. In this way, natural language utterances of the video game player 130 can be translated into text that, in turn, can be translated into game commands and/or displayable text on the display 120 or displays of other video game players. In particular, a neural network can be pre-trained for speech recognition on an offline system. And the trained neural network can be implemented as the collection of diffractive optical layers of the optical computer system 114.

In the illustrative example, audio input 113 is sent from a computational resource to the optical computer system 114 over an application programming interface (API) 112. The audio input is converted into an image for display by an imager to a multi-purpose optical device of the optical computer system 114. The diffracted light out from the multi-purpose optical device can be detected by an image sensor of the optical computer system 114 and converted to an output text 115. This output text 115 can be sent back to the same or different computational resource over the API 112 or a different API.

Similarly, a context of the video game can be sent over an API to the optical computer system 114. In response, the context is converted into an image for display by the imager to the multi-purpose optical device. The diffracted light can be detected by the image sensor and converted into video game data. This video game data can be sent to the GPU 118 as graphics input 117 over an API 116. The GPU 118 renders the video game content as graphics output 119 that is then sent over the same or a different API for presentation at the display 120.

According to this illustrative example, some of the operations of the video game console 110 can be allocated to the optical computer system 114, including video game data reads and speech recognition. Such operations can be run in parallel with operations performed by other computational resources of the video game console 110.

In the interest of clarity of explanation, various embodiments of the present disclosure are described in connection with data storage and with compute operations for speech recognition as an application on an optical computer system. However, the embodiments are not limited as such and apply to other possible purposes that can be implemented as diffractive optical layers, including other types of compute operations (e.g., object detection, speech synthetization, and other applications). Generally, a compute operation of an application can be defined as a set of interrelated operations. Each of such operations can be implemented as an diffractive optical layer of a multi-purpose optical device and the different diffractive optical layers can be arranged depending on the dependencies between the sub-operations.

In addition, the optical computer system can include a plurality of multi-purpose optical devices, one for each supported application. A single multi-purpose optical device that supports a plurality of applications can also or alternatively be used. In this case, each diffractive optical layer can contain one or more optical compute portions corresponding to one of the supported applications. For instance, if speech recognition and object detection were to be supported as a ten-layer neural network and a fifteen-layer neural network, respectively, the multi-purpose optical device can include fifteen diffractive optical layers. Ten of these diffractive optical layers can have optical compute portions for the two applications side-by-side, and remaining five of the diffractive optical layers can have optical computer portions for only the object detection application.

In other words, a multi-purpose optical device of an optical computer system represents an optical device configured for multiple purposes. In one example, the purposes are for data storage and a particular application. In another example, the purposes are for different applications without data storage. In yet another example, the purposes are for a plurality of data storages and a plurality of applications.

Furthermore, although FIG. 1 illustrates an optical computer system on a video game console, such a system can be implemented differently. For instance, the optical computer system can be installed on a server communicatively coupled with the video game console and/or can be part of an optical disk for a video game, where the optical disk can be inserted in the video game console.

Figure 2:
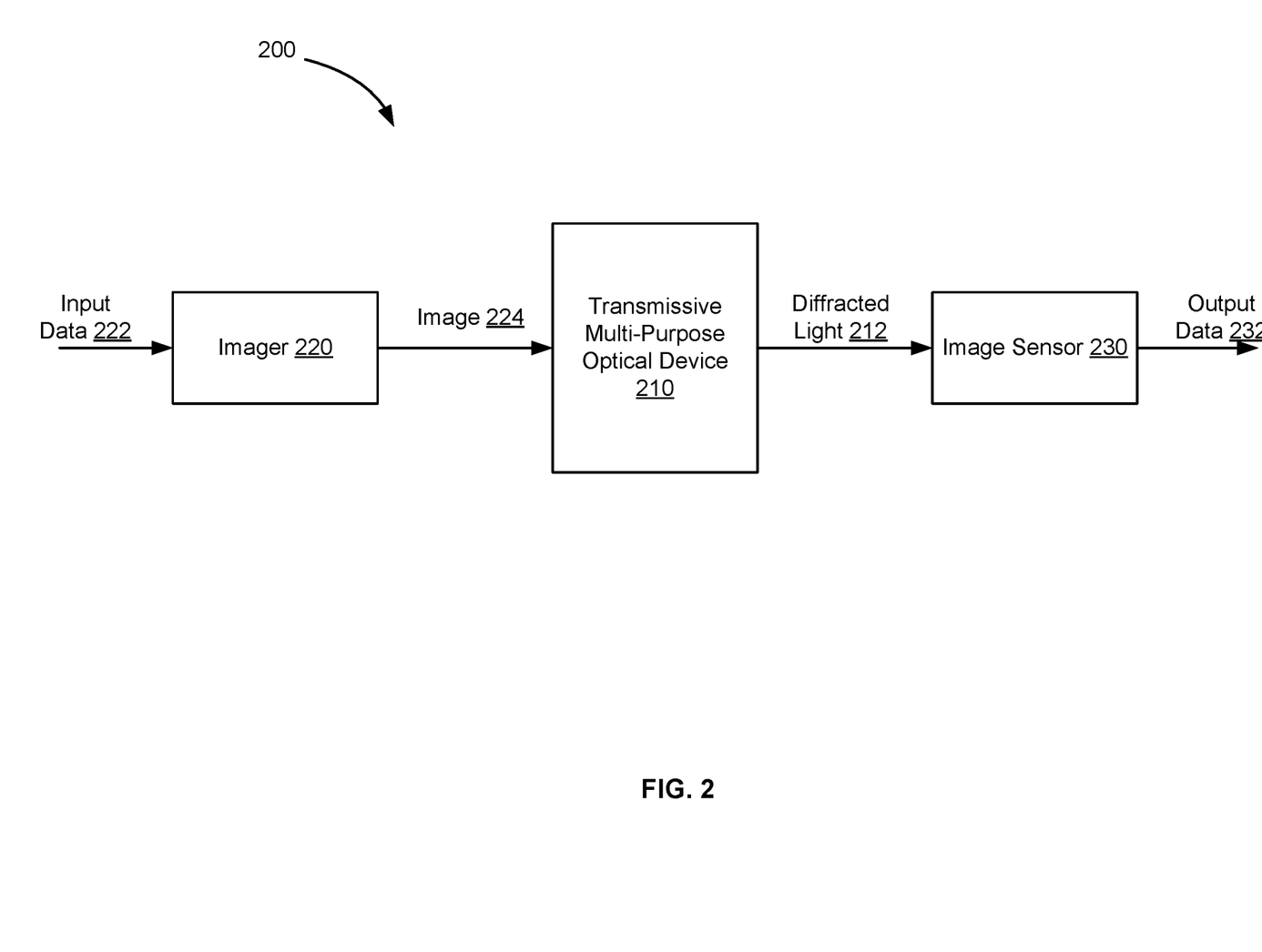
FIG. 2 illustrates an example optical computer system, according to embodiments of the present disclosure.

FIG. 2 illustrates an example optical computer system 200, according to embodiments of the present disclosure. The optical computer system 200 is an example of the optical computer system 114 of FIG. 1. As illustrated, the optical computer system 200 includes a transmissive multi-purpose optical device 210, an imager 220, and an image sensor 230. The transmissive multi-purpose optical device 210 includes a plurality of diffractive optical layers. In response to input data 222, the imager 220 displays an image 224 to an input side of the transmissive multi-purpose optical device 210. Light forming the image travels through this device 210 and is diffracted through its diffractive optical layers. Because of the transmissivity, the diffracted light 212 is transmitted out from an output side of the transmissive multi-purpose optical device 210 to the image sensor 230. The output side can be opposite to or, more generally, different from the input side. The image sensor 230 converts the diffracted light 212 into output data 232.

Generally, depending on the input data 222, a specific image 224 is generated to invoke one of the purposes of the transmissive multi-purpose optical device 210. In an example, the transmissive multi-purpose optical device 210 is usable for two purposes: one, for data storage and two, for compute operations of a speech recognition application. On one hand, if data storage were to be invoked, the input data 222 corresponds to a read command that identifies an address of the data on the transmissive multi-purpose optical device 210. The imager 210 generates an image 224 that contains lighting information for the retrieval of data encoded at the optical data storage position (e.g. the address) or that optically encodes this address. Upon display of this image 224, the image 224 (or light representing the image 224) diffracts through the transmissive multi-purpose optical device 210 and the image sensor 230 can read and output the data stored at the address. In an example of holographic data storage, diffractive elements are at a region X, which contains multiple addresses Ys. The address encoding is used as a key, where the image 224 is a reference light interference pattern (Y). A single spatial portion (X region) of the multi-purpose optical device can have multiple stored data points (Zs). These data points are the interference pattern of the address reference pattern (Y) combined with the interference pattern generated from the data (Z) that is stored. On the other hand, if speech recognition where to be invoked, the input data 222 corresponds to audio input. The imager 210 generates an image 224 that optically encodes the audio input. Upon display of this image 224, the image 224 (or light representing the image 224) diffracts through optical compute portions at the different diffractive optical layers. The diffracted light 212 out from the transmissive multi-purpose optical device 210 represents an output of performing the speech recognition and is sensed by the image sensor 230.

Although a single imager, a single multi-purpose optical device, and a single image sensor are described, the embodiments of the present disclosure are not limited as such. Instead, the embodiments similarly apply to any other number of imagers, multi-purpose optical devices, and/or image sensors. For example, for a dual-purpose optical device (e.g., one for data storage and one for compute operations), two imagers and two image sensors may be used. In this example, one pair of imager and image sensor are used for the data storage and another pair of imager and image sensor are used for the compute operations. In another example, one pair of imager and image sensor can be used in connection with multiple multi-purpose optical devices or multiple single-purpose optical devices, where each of the single-purpose optical devices are installed for a different purpose (e.g., one for data storage and a different one for compute operations).

Figure 3:
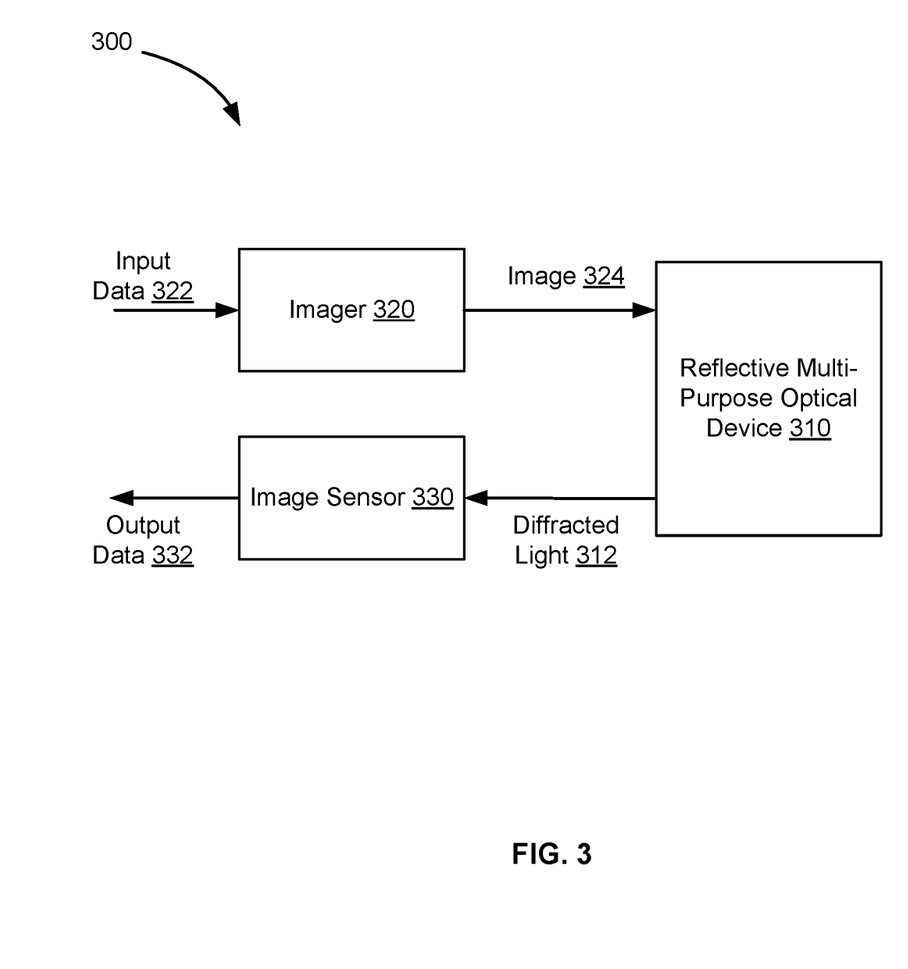
FIG. 3 illustrates another example optical computer system, according to embodiments of the present disclosure.

FIG. 3 illustrates another example optical computer system 300, according to embodiments of the present disclosure. The optical computer system 300 is another example of the optical computer system 114 of FIG. 1. As illustrated, the optical computer system 300 includes a reflective multi-purpose optical device 310, an imager 320, and an image sensor 330. The reflective multi-purpose optical device 310 includes a plurality of diffractive optical layers. In response to input data 322, the imager 320 displays an image 324 to an input/output (I/O) side of the reflective multi-purpose optical device 310. Light forming the image travels through this device 310 and is diffracted through its diffractive optical layers. Because of the reflectivity, the diffracted light 312 is transmitted out from the I/O side of the reflective multi-purpose optical device 310 to the image sensor 330. The image sensor 330 converts the diffracted light 312 into output data 332. The operations and controls of the imager 320, the reflective multi-purpose optical device 310, and the image sensor 330 are similar to those of the imager 220, the transmissive multi-purpose optical device 210, and the image sensor 230 of FIG. 2. One difference is that the reflective multi-purpose optical device 310 includes a reflective layer, e.g., one made out of aluminum or other reflective material, that is generally on the side opposite to the I/O side. Another difference is that the imager 320 and the image sensor 330 are on the same side relative to the reflective multi-purpose optical device 310, whereas the transmissive multi-purpose optical device 210 is arranged between the image 220 and the image sensor 230.

Generally, depending on the input data 322, a specific image 324 is generated to invoke one of the purposes of the transmissive multi-purpose optical device 310. In an example, the transmissive multi-purpose optical device 310 is usable for two purposes: one, for data storage and two, for compute operations of a speech recognition application. On one hand, if data storage were to be invoked, the input data 322 corresponds to a read command that identifies an address of the data on the transmissive multi-purpose optical device 310. The imager 310 generates an image 324 that contains lighting information for the retrieval of data encoded at the optical data storage position (e.g. the address) or that optically encodes this address. Upon display of this image 324, the image 324 (or light representing the image 324) diffracts through the transmissive multi-purpose optical device 310 and the image sensor 330 can read and output the data stored at the address. On the other hand, if speech recognition were to be invoked, the input data 322 corresponds to audio input. The imager 310 generates an image 324 that optically encodes the audio input. Upon display of this image 324, the image 324 (or light representing the image 324) diffracts through optical compute portions at the different diffractive optical layers. The diffracted light 312 out from the transmissive multi-purpose optical device 310 represents an output of performing the speech recognition and is sensed by the image sensor 330.

Although an imager and an image sensor are described as two separate components, the embodiments of the present disclosure are not limited as such. Instead, the embodiments similarly apply to an imager and an image sensor integrated as a single component in a reader head.

Figure 4:
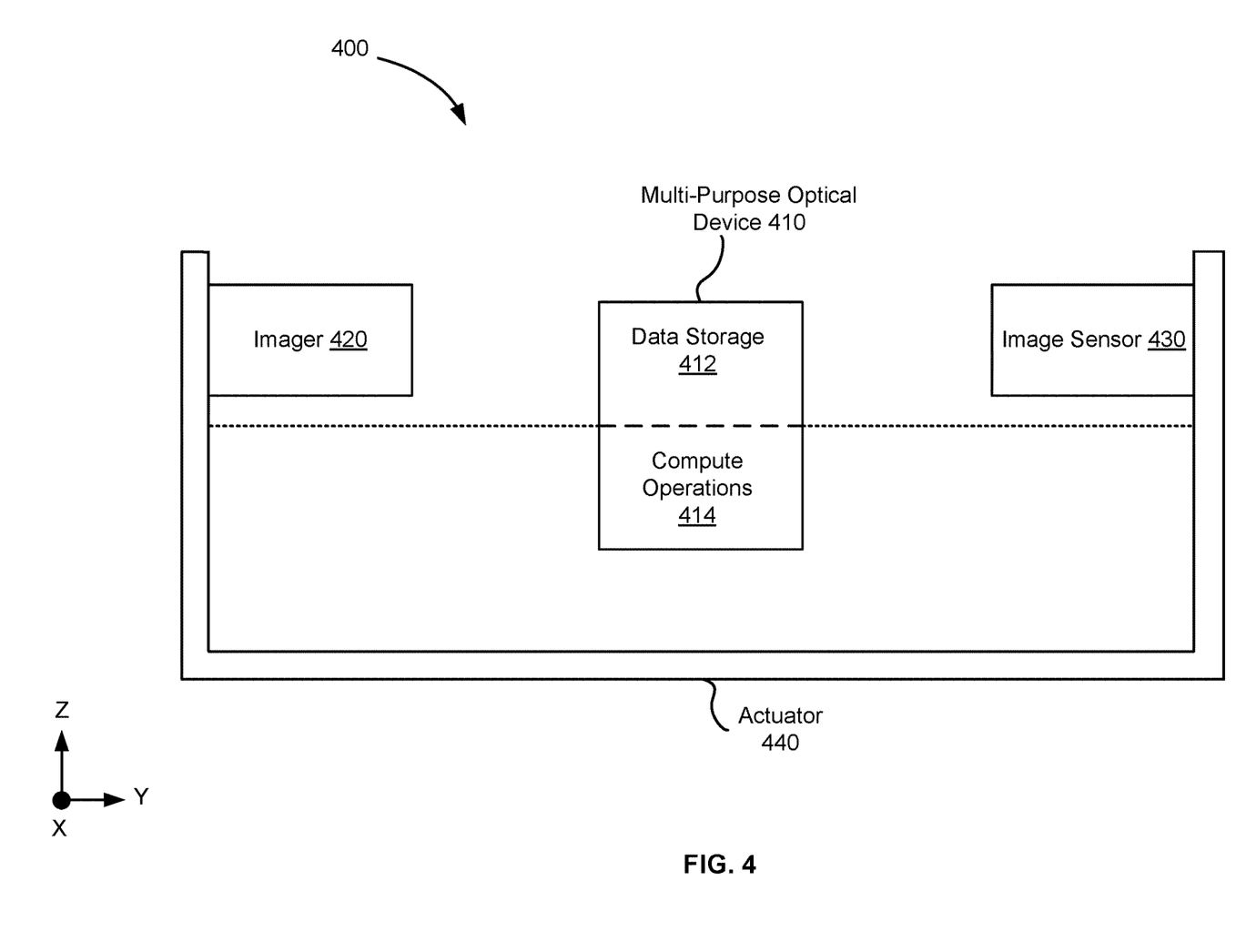
FIG. 4 illustrates an example reader head of an optical computer system, according to embodiments of the present disclosure.

FIG. 4 illustrates an example reader head 400 of an optical computer system, according to embodiments of the present disclosure. As illustrated in the side view (e.g., along a Z plane), the reader head 400 includes an actuator 440, and imager 420, and an image sensor 43. The imager 420 and the image sensor 430 are mounted on the actuator 440. A multi-purpose optical device 410 is positioned between the image 420 and the image sensor 430 (although the imager 420 and the image sensor 430 can be on the same side relative to this optical device 410, as illustrated in FIG. 3). In this example, the actuator 440 has a substantially U-shape to mechanically move the image 420 and the image sensor 430 relative to the multi-purpose optical device 410 (although an L-shape or other shapes of the actuator 440 are also possible including, for instance, when the image sensor 430 can be on the same side relative to this optical device 410, as illustrated in FIG. 3).

In an example, the imager 420 includes an array of monochromatic light sources that emit coherent light (e.g., vertical-cavity surface-emitting laser (VCSEL) lasers), incoherent light (e.g. light emitting diodes (LEDs), or partially coherent light (e.g., super luminescent LEDs), beam manipulation optics (e.g., Micro Lens Array), and optical modulators (e.g., liquid crystal on silicon (LCOS) spatial light modulators). The emitted light can be in the visible range, such as in the range between 400 nm and 700 nm for its wavelength, or in the invisible range such as between 700 nm and 1 mm. The image sensor 430 is an array of light sensors, such as by being a charge-coupled device (CCD) sensor or a semiconductor (CMOS) sensor that includes an array of light-capturing cells. The actuator 440 has two arms and a base. The imager 420 is mounted on the inner side of one arm (inner being defined relative to the internal space defined by the two arms) and the image sensor 430 is mounted on the inner side of the other arm. The arms actuate in the X and Z positions to move reader head 400 relative to the X and Z planes of the multi-purpose optical device 410.

Figure 6:
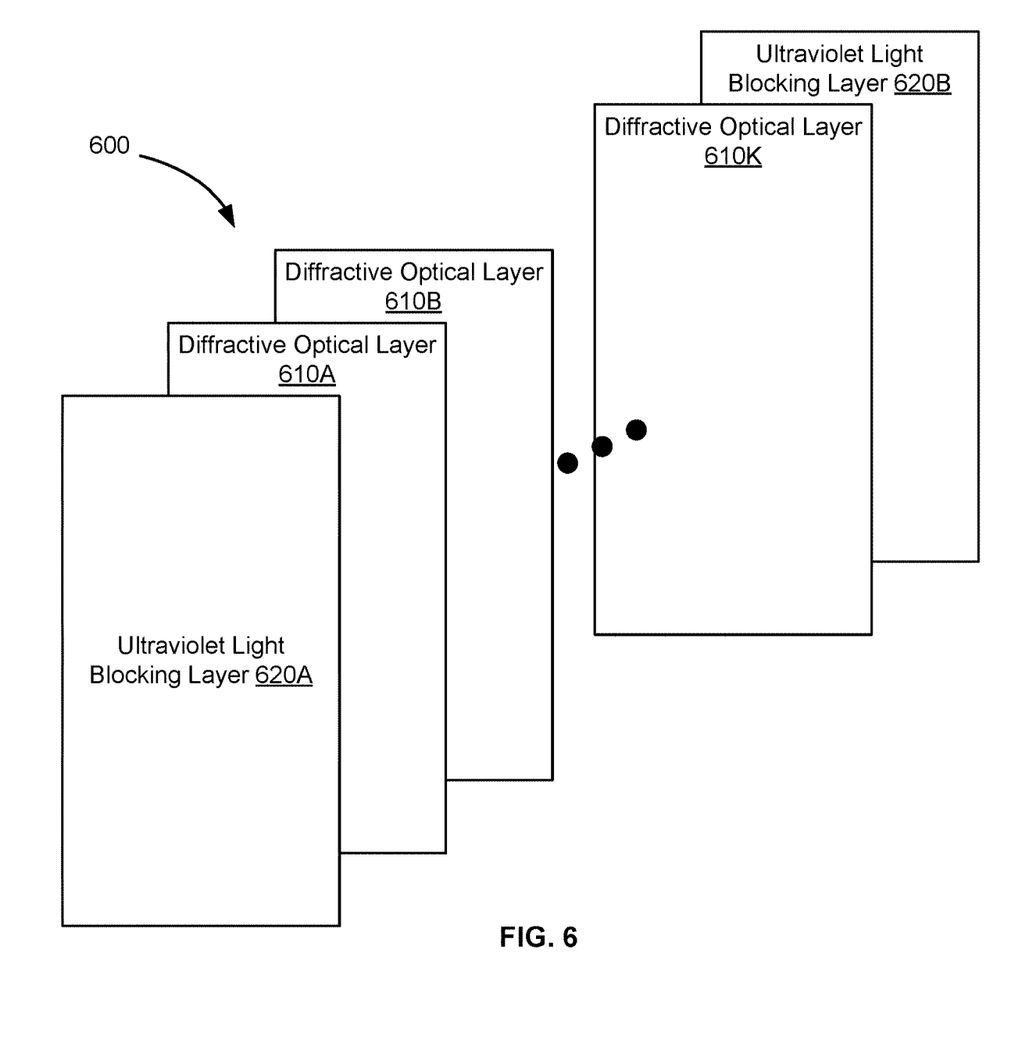
FIG. 6 illustrates an example multi-purpose optical device, according to embodiments of the present disclosure.
Figure 7:
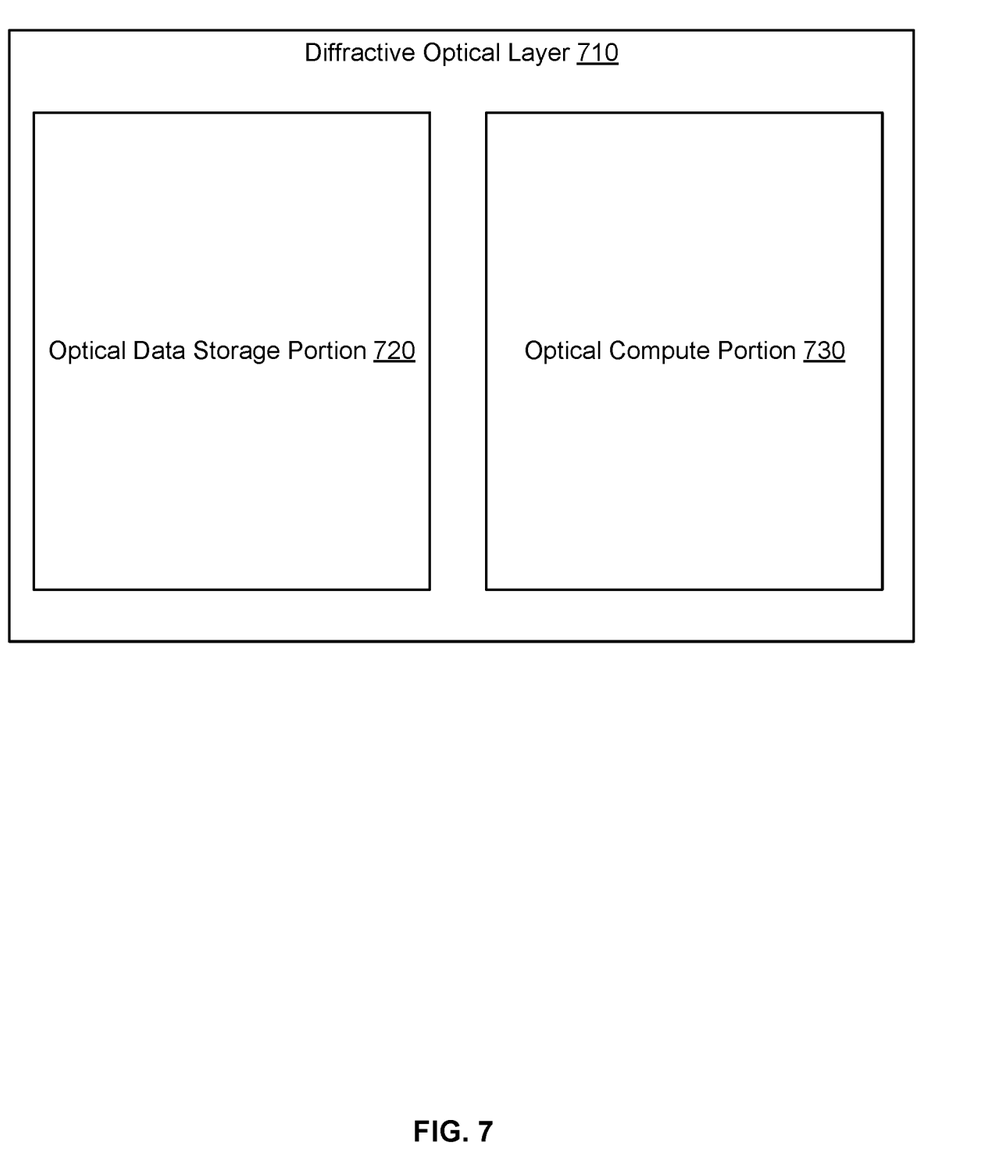
FIG. 7 illustrates an example diffractive optical layer of a multi-purpose optical device, according to embodiments of the present disclosure.

The multi-purpose optical device 410 includes a data storage volume 412 and a compute operations volume 414, each of which spans a number of diffractive optical layers of the multi-purpose optical device 410 (as further illustrated in FIGS. 6 and 7). The two volumes can be arranged side-by-side along an X plane (as illustrated in FIG. 4 with the dashed line). In response to a data read command, the actuator 440 is controlled to move the image 420 and image sensor 430 to a position that corresponds to the data storage volume 412 (shown as a position over the dashed line along an X plane). In response to a data read command, the actuator 440 is controlled to move the imager 420 and the image sensor 430 to a position that corresponds to the data storage volume 412 (shown as a position over the dashed line along an X plane), such as to be parallel to the data storage volume 412. In response to a compute command, the actuator 440 is controlled to move the imager 420 and the image sensor 430 to a position that corresponds to the compute operations volume 414 (shown as a position below the dashed line), such as to be parallel to the compute operations volume 414. Particularly, the imager 420 and the image sensor 430 are actuated in the X and Z plane below the dashed line to emit light to a particular sub-area of or the entire input side of the compute operations volume 414 and sense diffracted light from a particular sub-area of or the entire of the compute operations volume 414.

The array of light sensors on the imager 420 generally corresponds to pixels that define a certain resolution. Similarly, the array of light-capturing cells of the image sensor 430 corresponds to pixels that define a certain resolution. The resolutions of the imager 420 and the image sensor 430 can but need not be the same. For instance, each of the two resolutions is 256×256. In addition, the size of the pixels of the imager 420 and the image sensor 430 can but need not be the same.

In the example of speech recognitions, subsets of the pixels of the image sensor 430 are defined for phonemes or letters. For instance, the English language is composed of forty-four phonemes. The 6×6 pixels on the top left corner can correspond to one particular phoneme. In this way, the activation of these pixels based on the diffracted light out from the multi-purpose optical device 410 can be converted to the particular phoneme.

In comparison, each of the diffractive optical layers of the multi-purpose optical device 410 includes diffraction elements, such as diffractive gratings, pits, or obstacles on the surface or within the diffractive optical layer. These diffraction elements also correspond to pixels of the diffractive optical layer having a particular resolution. Generally the resolution of each of the diffractive optical layers is different from the resolutions of the imager 420 and the image sensor 430. In addition, the size of each pixels of the imager 420 and the image sensor 430 is generally larger than the size of each pixels within the multi-purpose optical device 410.

Figure 5:
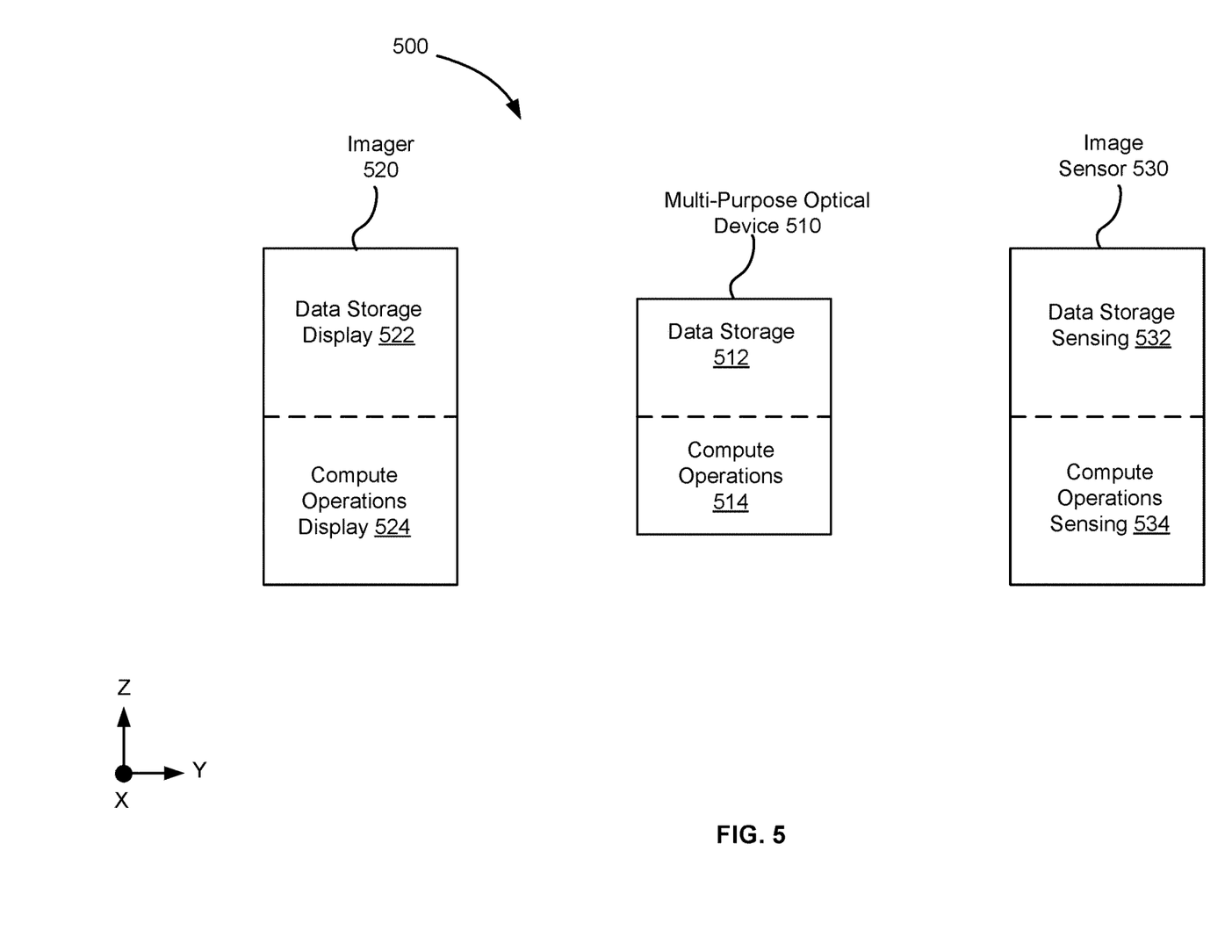
FIG. 5 illustrates another example reader head of an optical computer system, according to embodiments of the present disclosure.

FIG. 5 illustrates another example reader head 500 of an optical computer system, according to embodiments of the present disclosure. As illustrated in the side view (e.g., along a Z plane), the reader head 500 includes and imager 520 and an image sensor 530. A multi-purpose optical device 510 is positioned between the image 520 and the image sensor 530 (although the imager 520 and the image sensor 530 can be on the same side relative to this optical device 510, as illustrated in FIG. 3). Unlike the reader head 400 of FIG. 4, the reader head 500 here does not include a mechanical actuator. Instead, controlling the operations of the multi-purpose optical device 510 (e.g., whether to read data or to perform a compute operations) can be performed electronically.

In an example, the multi-purpose optical device 510 includes a data storage volume 512 and a compute operations volume 514, each of which spans a number of diffractive optical layers of the multi-purpose optical device 510 (as further illustrated in FIGS. 6 and 7). The two volumes can be arranged side-by-side along an X plane (as illustrated in FIG. 5 with the dashed line).

In comparison, the imager 520 has a display area formed by at least an array of light sources. The display area faces an input side of the multi-purpose optical device 510. As illustrated in FIG. 5, the display area and the input side are parallel to each other in an X-Z plane. The size of the display area is larger than the size of the input side (e.g., the height and width of the display area are greater than the height and width of the input side, respectively).

The display area can be divided into two portions: a data storage display 522 and a compute operations display 524. For instance, the display area is divided in half (or some other fraction), where the upper half (relative to the dashed line) is for the data storage display 522 and the lower half (relative to the dashed line) is for the compute operations display 524. Images encoding data locations within the data storage volume 512 are displayed on the data storage display 522. Images encoding input for a compute operation to be processed through the compute operations volume 514 are displayed on the compute operations display 524.

Similarly, the image sensor 530 has a sensing area formed by at least an array of light sensors. The sensing area faces an output side of the multi-purpose optical device 510. As illustrated in FIG. 5, the sensing area and the output side are parallel to each other in an X-Z plane. The size of the sensing area is larger than the size of the output side (e.g., the height and width of the sensing area are greater than the height and width of the output side, respectively).

The sensing area can be divided into two portions: a data storage sensing 532 and a compute operations sensing 534. For instance, the sensing area is divided in half (or some other fraction), where the upper half (relative to the dashed line) is for the data storage sensing 532 and the lower half (relative to the dashed line) is for the compute operations sensing 534. Diffracted light from the data storage volume 512 is sensed by the data storage sensing 532. Diffracted light from the compute operations volume 514 is sensed by the compute operations sensing 534.

Hence, in response to a data read command, a first image is displayed on the data storage display 522. Corresponding light travels through the data storage volume 512 and first diffracted light is output from the data storage volume 512 and sensed by the data storage sensing 532. In response to a compute command, a second image is displayed on the compute operations display 524. Corresponding light travels through the compute operations volume 514 and second diffracted light is output from the compute operations volume 514 and sensed by the compute operations sensing 534. Unlike the reader head 400 of FIG. 4, the reader head 500 allows for parallel data read and compute operation, where the first and second images can be displayed simultaneously and the first and second diffracted lights can be sensed simultaneously.

Other configurations of a reader head are possible for alternating between or performing in parallel a data read and a compute operation. For instance, light sources of an imager can be electronically steered via an LCOS spatial light modulator using digital blazed gratings, causing angled light beams onto a reflective multi-purpose optical device that bounces diffracted image light on to light sensors of an image sensor.

FIG. 6 illustrates an example multi-purpose optical device 600, according to embodiments of the present disclosure. As illustrated, the multi-purpose optical device 600 includes a plurality of diffractive optical layers 610A, 610B, . . . , 610K (generally referred to with the number 610), each of which can be made of one or more solid materials. For example, a polymeric material can be used, such as plastic that is transparent to light within a desired wavelength range (e.g., 400 nm to 700 nm) or a photopolymer film containing silver halide particles mounted on transparent plastic.

The number of diffractive optical layers depends on a number of factors, including the purposes of the multi-purpose optical device 600. In an example, the multi-purpose optical device 600 is for data storage and for compute operations of an application (e.g., speech recognition). In this example, one factor relates to the amount of desired data storage. Another factor relates to the compute operations.

In particular, some or each of the diffractive optical layers 610 can be used for holographic data storage. For example, One terabit of data can be stored per square millimeter. Hence, if multiple terabits (e.g., ten) are desired and if one square millimeter is allocated for data storage per diffractive optical layer, multiple diffractive optical layers are needed (e.g., twenty).

Furthermore, the application can rely on a number of layers of an artificial neural network. Each of such layers can be implemented as a diffractive optical layer (in other words, each diffractive optical layer corresponds to a layer of the artificial neural network). In this case, the number of diffractive optical layers equals the number of layers of the artificial neural network.

By considering the two factors in conjunction, the number of diffractive optical layers is the greatest of the number needed for the data storage and the number of the neural network layers. In situations where the number of neural network layers is larger, some of the diffractive optical layers are used for both data storage and compute sub-operations, while remaining diffractive optical layers are used for only compute sub-operations. For instance, if one layer is sufficient for data storage, and if five layers are needed for a five-layer neural network, the multi-purpose optical device 600 can include a total of five diffractive optical layers. The first diffractive optical layer (or any other diffractive optical layer) includes an optical data storage portion and an optical compute portion arranged side-by-side. Each of the remaining four diffractive optical layers includes only an optical compute portion. The unused portions for data storage on the remaining diffractive optical layers (e.g., the four layers in this illustration) would have no diffractive pattern and be effectively transparent, passing input or data layer diffracted light as is.

The diffractive optical layers 610 are arranged in a stack arrangement based on light diffraction between the diffractive optical layers 610. The diffractive optical layers 610 can be separated by air gaps (having pre-designed dimensions, beyond potential manufacturing intolerances that may unintentional introduce gaps) or can be compressed and attached together with an optical glue transparent to light within the desired wavelength range. The diffractive optical layers 610 can be produced with three dimensional (3D) additive or subtractive printing, etching, injection molding, lithography processing, rapid stamping process, and/or roll-to-roll processing.

In the arrangement, the diffractive optical layers 610 are aligned such that the light is diffracted in a manner that would mimic connections between neurons of different layers of the artificial neural network. For instance, a first diffractive optical layer corresponds to a first neural network layer having first neurons, and a second diffractive optical layer corresponds to a second neural network layer having second neurons. A first neuron from the first neurons is connected to one or more second neurons of the second neurons, where the connection(s) has a particular weight. A weighted connection between the first neural and a second neuron represents a particular transformation from the first layer to the second layer. In comparison, one or more first pixels of the first diffractive optical layer correspond to the first neuron. Light arriving to the first pixel(s) is diffracted out to the second diffractive optical layer. The diffracted light should arrive, in a manner that represents the transformation, to one or more pixels of the second diffractive optical layer corresponding to the second neuron. Accordingly, the first and second diffractive optical layers are aligned such that the diffracted light from the first diffractive optical layer to the second diffractive optical layer represents a sub-operation equivalent to a non-linear transformation between the first neural network layer and the second neural network layer.

Additionally, when transmissive, the multi-purpose optical device 600 includes an ultraviolet (UV) light blocking layer 620A at an input side of the multi-purpose optical device 600 and a UV light blocking layer 620B at an output side of the multi-purpose optical device 600. When reflective, a single UV light block layer may be sufficient on the I/O side of the multi-purpose optical device 600. On the opposite side to the I/O side, the multi-purpose optical device 600 can include a reflective optical layer, such as one made with aluminum. The ultraviolet (UV) light blocking layer could be used to ensure that the material of the diffractive layers maintain their structure and are not are affected (erased or modified) by the prolonged presence of ultraviolet light. Other layers or coatings could be used to enhance and/or maintain the performance of the diffractive layers, including Anti-Reflective (AR) coatings or films.

FIG. 7 illustrates an example diffractive optical layer 710 of a multi-purpose optical device, according to embodiments of the present disclosure. The multi-purpose optical device is configured to store data and perform one or more compute operations of an application (e.g., speech recognition). Accordingly, the diffractive optical layer 710 includes an optical data storage portion 720 and an optical compute portion 730. The optical data storage portion 730 stores at least a subset of the data. The optical compute portion 730 is configured to perform a sub-operation of the one or more compute operations. Each of the configurations can be implemented by using diffractive portions on and/or in the data storage portion 720 and the optical compute portion 730. The configurations of the diffraction elements can be can different between these two portions 720 and 730.

As illustrated, the optical data storage portion 720 and the optical compute portion 730 are arranged side-by-side while also being separated (e.g., they do not overlap). The size of the separation can vary. Generally, a minimal separation can be used, where this minimum is defined as a function of the wavelength of the light (e.g., four times the wavelength). The optical data storage portion 720 and the optical compute portion 730 need not have the same shape or same size.

Generally, the diffractive optical layer 710 is made out of a polymeric material, such as plastic that is transparent to light within a desired wavelength range (e.g., 400 nm to 700 nm). Light diffraction through each of the optical data storage portion 720 and the optical compute portion 730 can be achieved by using diffraction elements (e.g., diffraction gratings, pits, or obstacles) on the external surface of the diffractive optical layer 710 and/or or within the internal volume of the diffractive optical layer 710. A set of the diffraction elements correspond to a pixel of the diffractive optical layer 710 (e.g., a diffractive pixel).

In an example, the optical data storage portion 720 is a holographic data storage portion. In this example, the diffractive optical layer 710 includes 2D or 3D holograms (e.g., storing the data) within its internal volume defined by the optical data storage portion 720. In addition, the optical compute portion 730 includes surface and/or internal diffraction elements that form diffractive pixels. Each of the diffractive pixels corresponds to a set of neurons of the neural network layer that corresponds to the diffractive optical layer 710.

Depending on the material used, the optical data storage portion 720 is read only and the optical compute portion 730 is not reprogrammable. That can be the case with the polymeric material, such as a photopolymer film on transparent plastic or as etched plastic. However, the optical data storage portion 720 can be configured for read and write and/or the optical compute portion 730 can be reprogrammable. For instance, an electronic ink (e-ink) layer can be used, where diffraction elements can be updated in the data storage portion 720 for data write and in the optical compute portion 730 for reprogramming. Additionally or alternatively, a resin film can be used, where this film can be softened with a light having a particular wavelength, and upon hardening can form the diffraction elements for optical processing with a different light having a different wavelength.

Figure 8:
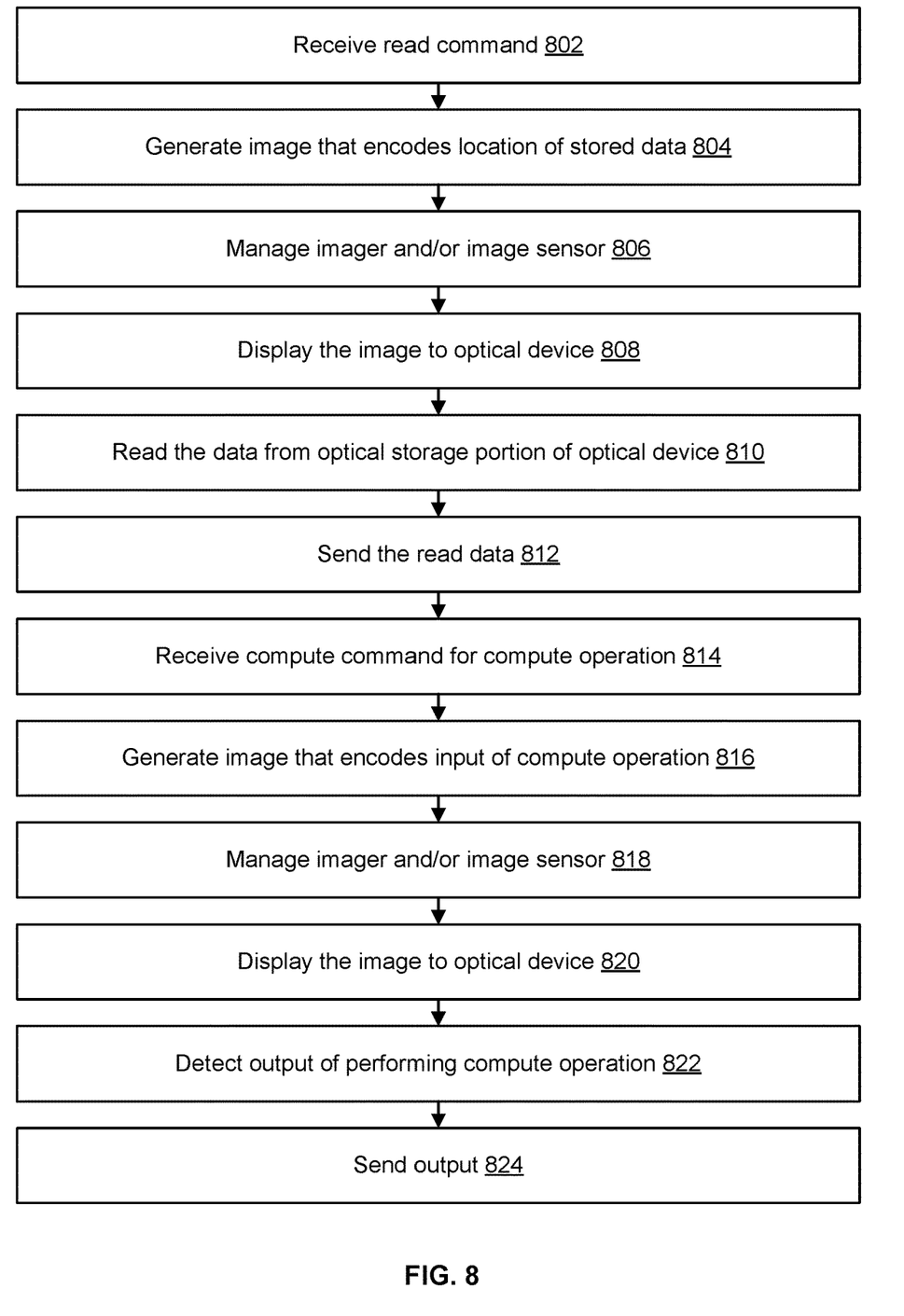
FIG. 8 illustrates an example flow for reading data and performing a compute operation on an optical computer system, according to embodiments of the present disclosure.

FIG. 8 illustrates an example flow for reading data and performing a compute operation on an optical computer system, such as the optical computer system 114 of FIG. 1, according to embodiments of the present disclosure. The operations of the flow can be implemented as hardware circuitry and/or stored as computer-readable instructions on a non-transitory computer-readable medium of the optical computer system. As implemented, the instructions represent modules that include electronic circuitry or code executable by a processor(s) of the optical computer system and/or optical circuitry. The execution of such instructions configures the optical computer system to perform the specific operations described herein. Each circuitry or code in combination with the processor, as applicable, represents a means for performing a respective operation(s). While the operations are illustrated in a particular order, it should be understood that no particular order is necessary and that one or more operations may be omitted, skipped, and/or reordered.

In an example, the flow includes an operation 802, where the optical computer system receives a read command. The read command can be sent from a computational resource over an API or a high speed communications bus. The read command corresponds to reading data, where the data is stored in a data location at an optical data storage portion of a multi-purpose optical device of the optical computer system. The read command can identify the data location.

In an example, the flow includes an operation 804, where the optical computer system generates an image that encodes the data location of the stored data. For instance, the image is a monochromatic image that includes a pattern that represents the data location.

In an example, the flow includes an operation 806, where the optical computer system manages an imager and/or an image sensor to perform the read command. In particular, if a mechanical actuator is implemented in a reader head of the optical computer system, this actuator is controlled to move the imager and the image sensor to positions that correspond to the optical data storage portion (e.g., to be parallel to the optical data storage volume containing this optical data storage portion). If no mechanical actuator is used, the optical computer system can send the image to the imager with instructions to display it on a data storage display.

In an example, the flow includes an operation 808, where the optical computer system displays the image to the multi-purpose optical device. For instance, the imager displays the image on its display. Light emitted from the image travels to the multi-purpose optical device and is diffracted through the optical data storage portion. The diffracted light travels out from the multi-purpose optical device.

In an example, the flow includes an operation 810, where the optical computer system reads the data from the optical storage portion. For instance, the diffracted light is detected by the image sensor that converts it into an output data, such as a set of data bits or bytes.

In an example, the flow includes an operation 812, where the optical computer system sends the read data. For instance, the output data is sent over the API or the high speed communications bus to the computational resource.

In an example, the flow includes an operation 814, where the optical computer system sends a computer command for a compute operation. The compute command can be sent from the same or a different computational resource over the same or a different API or the same or a different high speed communications bus. The compute command includes data input to be processed by optically performing the compute operation. For instance, the compute command can include audio input for a speech recognition compute operation.

In an example, the flow includes an operation 816, where the optical computer system generates an image that encodes the data input of the compute operation. For instance, the image is a monochromatic image that includes a pattern that represents the data input.

In an example, the flow includes an operation 818, where the optical computer system manages the imager and/or the image sensor to perform the compute command. In particular, if a mechanical actuator is implemented in the reader head, this actuator is controlled to move the imager and the image sensor to positions that correspond to the optical compute portion (e.g., to be parallel to the optical compute volume containing this data compute portion). If no mechanical actuator is used, the optical computer system can send the image to the imager with instructions to display it on a compute operations display.

In an example, the flow includes an operation 820, where the optical computer system displays the image to the multi-purpose optical device. For instance, the imager displays the image on its display. Light emitted from the image travels to the multi-purpose optical device and is diffracted through the optical compute portion. The diffracted light travels out from the multi-purpose optical device.

In an example, the flow includes an operation 822, where the optical computer detects an output of performing the compute operation. For instance, the diffracted light is detected by the image sensor that converts it into the output.

In an example, the flow includes an operation 824, where the optical computer system sends the output. For instance, the output is sent over the API or the high speed communications bus to the computational resource.

The read command and the compute command can be executed sequentially, whereby the image corresponding to the read command is displayed at one point in time and the image corresponding to the compute command is displayed at a different point in time. Alternatively, the read command and the compute command can be executed in parallel, whereby the two images are displayed at the same time.

Figure 9:
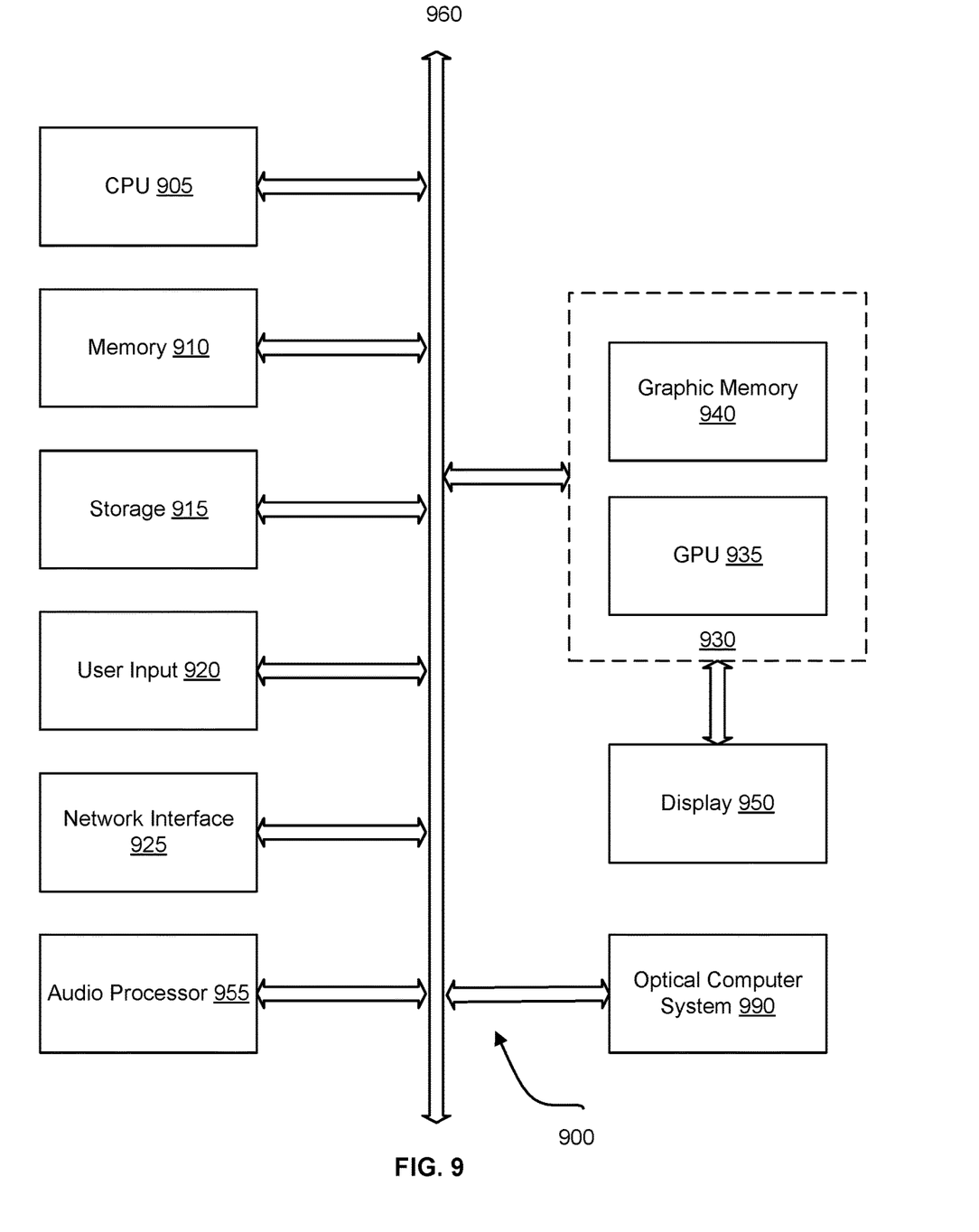
FIG. 9 illustrates an example of a hardware system suitable for implementing a computer system, according to embodiments of the present disclosure.

FIG. 9 illustrates an example of a hardware system suitable for implementing a computer system 900 in accordance with various embodiments. The computer system 900 represents, for example, components of the computer system 110 illustrated in connection with FIG. 1. The computer system 900 includes a central processing unit (CPU) 905 for running software applications and optionally an operating system. The CPU 905 may be made up of one or more homogeneous or heterogeneous processing cores. Memory 910 stores applications and data for use by the CPU 905. Storage 915 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 920 communicate user inputs from one or more users to the computer system 900, examples of which may include keyboards, mice, joysticks, touch pads, touch screens, still or video cameras, and/or microphones. Network interface 925 allows the computer system 900 to communicate with other computer systems via an electronic communications network, and may include wired or wireless communication over local area networks and wide area networks such as the Internet. An audio processor 955 is adapted to generate analog or digital audio output from instructions and/or data provided by the CPU 905, memory 910, and/or storage 915. The components of computer system 900, including the CPU 905, memory 910, data storage 915, user input devices 920, network interface 925, and audio processor 955 are connected via one or more data buses 960.

A graphics subsystem 930 is further connected with the data bus 960 and the components of the computer system 900. The graphics subsystem 930 includes a graphics processing unit (GPU) 935 and graphics memory 940. The graphics memory 940 includes a display memory (e.g., a frame buffer) used for storing pixel data for each pixel of an output image. The graphics memory 940 can be integrated in the same device as the GPU 935, connected as a separate device with the GPU 935, and/or implemented within the memory 910. Pixel data can be provided to the graphics memory 940 directly from the CPU 905. Alternatively, the CPU 905 provides the GPU 935 with data and/or instructions defining the desired output images, from which the GPU 935 generates the pixel data of one or more output images. The data and/or instructions defining the desired output images can be stored in the memory 910 and/or graphics memory 940. In an embodiment, the GPU 935 includes 3D rendering capabilities for generating pixel data for output images from instructions and data defining the geometry, lighting, shading, texturing, motion, and/or camera parameters for a scene. The GPU 935 can further include one or more programmable execution units capable of executing shader programs.

The graphics subsystem 930 periodically outputs pixel data for an image from the graphics memory 940 to be displayed on the display device 950. The display device 950 can be any device capable of displaying visual information in response to a signal from the computer system 900, including CRT, LCD, plasma, and OLED displays. The computer system 900 can provide the display device 950 with an analog or digital signal.

In accordance with various embodiments, the CPU 905 is one or more general-purpose microprocessors having one or more processing cores. Further embodiments can be implemented using one or more CPUs 905 with microprocessor architectures specifically adapted for highly parallel and computationally intensive applications, such as media and interactive entertainment applications.

In addition, the computer system 900 includes an optical computer system 990. The optical computer system 990 connected with the data bus 960 and represents any of the optical computer systems described herein above in connection with FIGS. 1-8.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 75%, 90%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. An optical computer system comprising:
    an optical device configured to store data and perform one or more compute operations, the optical device comprising a plurality of diffractive optical layers made out of one or more solid materials, wherein:
        a first diffractive optical layer of the plurality of diffractive optical layers comprises an optical data storage portion and a first optical compute portion, the optical data storage portion storing at least a subset of the data, the first optical compute portion comprising diffraction elements that correspond to a sub-operation of the one or more compute operations;
        a second diffractive optical layer of the plurality of diffractive optical layers comprises a second optical compute portion, and
        the first optical compute portion and the second optical compute portion are arranged based on light diffraction from the first optical compute portion to the second optical compute portion;
    an imager configured to display an image to the optical device; and
    an image sensor configured to receive light diffracted from the optical device based on the image.

2. The optical computer system of claim 1, wherein the optical device is arranged between the imager and the image sensor, and wherein the optical device is transmissive of the light.

3. The optical computer system of claim 1, wherein the imager and the image sensor are arranged on a same side relative to the optical device, and wherein the optical device is reflective of the light.

4. The optical computer system of claim 1, wherein each of the plurality of diffractive optical layers comprises an optical compute portion and corresponds to a layer of an artificial neural network.

5. The optical computer system of claim 4, wherein each of the plurality of diffractive optical layers further comprises an optical data storage portion.

6. The optical computer system of claim 1, wherein the optical data storage portion is a holographic data storage portion.

7. The optical computer system of claim 6, wherein the holographic data storage portion and the first optical compute portion are arranged side-by-side.

8. The optical computer system of claim 1, wherein the imager comprises an array of light sources, beam manipulation optics, and an optical modulator mounted on an actuator, wherein the image sensor comprises an array of light sensors mounted on the actuator.

9. The optical computer system of claim 1, wherein the image is displayed as a monochromatic image having a wavelength between 400 nm and 700 nm.

10. The optical computer system of claim 1, further comprising an actuator, wherein the imager is attached to the actuator, and wherein the actuator is configured to move the imager between a first position corresponding to the optical data storage portion and a second position corresponding to the first optical compute portion.

11. The optical computer system of claim 1, wherein the imager comprises an array of light sources, wherein a first portion of the array has a first position corresponding to the optical data storage portion, and wherein a second portion of the array has a second position corresponding to the first optical compute portion.

12. The optical computer system of claim 1, wherein the diffraction elements of the first optical compute portion comprises pixels that are smaller in size than pixels of the imager and pixels of the image sensor.

13. An optical device comprising:
    a plurality of diffractive optical layers made out of one or more solid materials, wherein:
        a first diffractive optical layer of the plurality of diffractive optical layers comprises an optical data storage portion and a first optical compute portion, the optical data storage portion storing data, the first optical compute portion comprising diffraction elements that correspond to a sub-operation of one or more compute operations of the optical device;
        a second diffractive optical layer of the plurality of diffractive optical layers comprises a second optical compute portion, and
        the first optical compute portion and the second optical compute portion are arranged based on light diffraction from the first optical compute portion to the second optical compute portion.

14. The optical device of claim 13, wherein the first diffractive optical layer and the second diffractive optical layer are attached together via an optical glue in a stack arrangement.

15. The optical device of claim 13, further comprising an ultraviolet light blocking film attached to the first diffractive optical layer.

16. The optical device of claim 14, wherein the one or more solid materials comprise a polymeric material transparent to light having a wavelength between 400 nm and 700 nm.

17. The optical device of claim 16, wherein the first diffractive optical layer comprises electronic ink that form the diffraction elements.

18. A non-transitory computer-readable medium storing computer-readable instructions that, upon execution on a computer system, cause the computer system to perform operations comprising:

displaying, to an optical device of the computer system, a first image based on a data read command, wherein:

the optical device comprises a plurality of diffractive optical layers made out of one or more solid materials, and a first diffractive optical layer of the plurality of diffractive optical layers comprises an optical data storage portion that stores data;

reading the data from the optical data storage portion based on first light diffracted from the optical device in response to the first image;

displaying, to the optical device, a second image based on a compute command for a compute operation, wherein:

the first diffractive optical layer further comprises a first optical compute portion, the first optical compute portion comprises diffraction elements that correspond to a sub-operation of the compute operation, a second diffractive optical layer of the plurality of diffractive optical layers comprises a second optical compute portion, and the first optical compute portion and the second optical compute portion are arranged based on light diffraction from the first optical compute portion to the second optical compute portion; and detecting an output of performing the compute operation by the optical device, the output detected based on second light diffracted from the optical device in response to the second image.

19. The non-transitory computer-readable medium of claim 18, wherein the first image encodes a location of the data on the optical data storage portion, and wherein the second image encodes an input to the compute operation.

20. The non-transitory computer-readable medium of claim 18, wherein the first image and the second image are displayed sequentially or in parallel.

* * * * *